Patented Apr. 20, 1943

2,317,301

UNITED STATES PATENT OFFICE 2,317,301

PROCESS OF TREATING BUILDING MATERIALS

Anderson W. Ralston and Robert J. Vander Wal, Chicago, Ill., assignors to Armour and Company, Chicago, Ill., a corporation of Illinois No Drawing. Application April 3, 1941, Serial No. 386,680

10 Claims. (Cl. 117—123)

This invention relates to water-resistant building materials and processes of preparing the same, and it comprises preformed siliceous building materials, such as brick and concrete, which have been, after forming, treated with high molecular weight aliphatic amines or their salts; it further comprises processes wherein such preformed materials are treated with high molecular weight aliphatic amines, or salts thereof.

Most siliceous building materials, such as bricks and concrete, are readily wetted by water and the deterioration of these building materials, due to the weathering action, is a problem of considerable concern. Concrete roads, for example, take up water by capillarity thus weakening the road. When such absorbed moisture freezes the ice crystals thus developed tend to fracture the concrete thus rendering the concrete pavement much less resistant to mechanical abrasive forces.

Similar considerations apply to molded bricks and concrete blocks, and to concrete or cement mortars used in the erection of brick and concrete buildings. The deterioration of such cementitious bonding agents for brick and concrete blocks is fairly rapid and is usually due to the weathering action caused by the fact that such siliceous materials can readily take up moisture. Many basements are damp due to the passage of water from the exterior through the foundation.

The present invention has for its object ways of rendering such materials resistant to the passage of water therethrough. Our invention is based upon the discovery that the passage of water through bricks, concrete and like materials can be inhibited when such materials are treated with high molecular weight aliphatic amines or salts thereof.

In the practice of our invention we find it advantageous to treat the brick, concrete blocks, roads, walls, etc., with dilute solutions of the high molecular weight aliphatic amines or water-soluble salts thereof. One of the simplest ways is simply to immerse the brick in a dilute water solution of such an amine salt. The amine salt is preferentiallly adsorbed throughout the brick and after the brick has been dried it is water-resistant in that water will not pass through it. Either primary aliphatic amines or their salts can be used. After the brick has been treated with the amine or amine salt the adsorbed film of amine or amine salt cannot be removed. This is indicative of the fact that the amine or its salt has been adsorbed and has not merely coated portions of the brick. In this respect our process is entirely different from that of coating or "water-proofing" the brick or concrete surface by applying waxy or resinous coating compounds thereto. Such coating compounds simply form a surface layer; they do not penetrate into the brick or concrete.

There are many primary aliphatic amines which we can use. We find it best to use those amines, or salts thereof, having eight or more carbon atoms in the alkyl radical. Such amines are octylamine, decylamine, dodecylamine, tridecylamine, hexadecylamine, octadecylamine or octadecenylamine. Any of the water-soluble salts of these amines can be used. The hydrochloride or acetate can be readily prepared by simply reacting the amine with an aqueous solution of hydrochloric or acetic acid.

Very dilute solutions of the amine salts in water are entirely adequate for practicing the present invention. A solution consisting of two parts by weight of dodecylamine hydrochloride dissolved in 100 parts of water will render a brick resistant to the passage of water after about ten minutes' immersion in such solution. Thereafter the brick is dried. Solutions as dilute as one-half of 1%, and concentrations of 10% can be used effectively but we find that the higher concentrations are somewhat wasteful since only relatively minute quantities of the amine salt are actually incorporated with the brick. It does not take very much dodecylamine salt, for example, to treat the brick satisfactorily.

Ceramic insulating materials, especially suitable for electrical purposes, can be rendered resistant to the passage of water therethrough by immersion in a 1% solution of dodecylamine acetate. Alternatively, such solutions can be sprayed on concrete roads, curbing, brick walls, and the like. Or they can be applied by painting so that the preformed structure is well wetted with the aqueous amine solution. Concentrated solutions of amine salts have a paste-like consistency and we have found this paste to be satisfactory for this purpose.

In the above examples we have referred primarily to the use of primary aliphatic amines and their salts. Secondary amines, such as didodecylamine and its hydrochloride, methyldodecylamine and its hydrochloride, dioctylamine and its salts, and many others can be used so long as one of the alkyl groups in such secondary amines contains at least eight carbon atoms.

When we use the amine itself rather than its water-soluble salt the amine can be suspended in water with agitation or can be emulsified in water by the use of any suitable emulsifying agent, such as ordinary soap. This aqueous suspension or emulsion can then be sprayed or otherwise applied to preformed brick or concrete structures, or building blocks can be directly immersed in such suspensions. Aqueous suspensions or emulsions of the amine which contain from 1% to 10% of the amine are satisfactory. There is nothing critical about the preparation as far as the process itself is concerned, but it must be remembered that the consistency of the solution depends upon the concentration, and this has a bearing upon the method of application.

Although we have shown the use of fatty solutions or suspensions of amines or amine salts, we do not wish to be limited thereto as any solution or suspension of amine or amine salt in any solvent may also be used.

We claim:

1. The process of rendering siliceous construction materials resistant to the passage of water therethrough which comprises treating such siliceous materials after formation thereof into their ultimate shape with amines chosen from the group consisting of aliphatic amines containing at least eight carbon atoms in an alkyl group thereof, and salts thereof.

2. The process of rendering siliceous construction materials resistant to the passage of water therethrough which comprises treating such siliceous materials after formation thereof into their ultimate shape with an aqueous solution of an aliphatic amine salt containing at least eight carbon atoms in an alkyl group thereof.

3. The process of rendering siliceous construction materials resistant to the passage of water therethrough which comprises treating the siliceous constructional material after formation into its ultimate shape with dodecylamine hydrochloride.

4. The process of rendering siliceous construction materials resistant to the passage of water therethrough which comprises treating the siliceous constructional material after formation into its ultimate shape with octadecylamine hydrochloride.

5. A preformed siliceous constructional material in ultimate shape containing an amino compound chosen from the group consisting of aliphatic amines having at least eight carbon atoms in an alkyl group thereof, and salts thereof.

6. A cast or molded set siliceous material containing a substance chosen from the group consisting of aliphatic amines having at least eight carbon atoms in an alkyl group thereof, and salts thereof.

7. Brick containing a substance chosen from the group consisting of aliphatic amines having at least eight carbon atoms in an alkyl group thereof, and salts thereof.

8. Cast concrete containing a substance chosen from the group consisting of aliphatic amines having at least eight carbon atoms in an alkyl group thereof, and salts thereof.

9. The process of rendering bricks water-repellent which comprises treating the brick with an amino compound chosen from the group consisting of aliphatic amines containing at least eight carbon atoms in an alkyl group thereof, and salts thereof.

10. The process of rendering cast concrete structures water-repellent which comprises treating the concrete structure with an amino compound chosen from the group consisting of aliphatic amines containing at least eight carbon atoms in an alkyl group thereof, and salts thereof.

ANDERSON W. RALSTON.
ROBERT J. VANDER WAL.